US012246826B2

(12) United States Patent
Waide

(10) Patent No.: US 12,246,826 B2
(45) Date of Patent: Mar. 11, 2025

(54) CABLE TILT ACTUATOR FOR AN AIRCRAFT

(71) Applicant: Overair, Inc., Santa Ana, CA (US)

(72) Inventor: William Martin Waide, Central Point, OR (US)

(73) Assignee: Overair, Inc., Santa Ana, CA (US)

( * ) Notice: Subject to any disclaimer, the term of this patent is extended or adjusted under 35 U.S.C. 154(b) by 68 days.

(21) Appl. No.: 18/037,887

(22) PCT Filed: Nov. 21, 2021

(86) PCT No.: PCT/US2021/060232
§ 371 (c)(1),
(2) Date: May 19, 2023

(87) PCT Pub. No.: WO2022/109356
PCT Pub. Date: May 27, 2022

(65) Prior Publication Data
US 2024/0002049 A1    Jan. 4, 2024

Related U.S. Application Data

(60) Provisional application No. 63/117,152, filed on Nov. 23, 2020.

(51) Int. Cl.
*B64C 29/00*    (2006.01)
*B64C 3/32*     (2006.01)
*B64C 27/72*    (2006.01)

(52) U.S. Cl.
CPC ............ *B64C 29/0033* (2013.01); *B64C 3/32* (2013.01); *B64C 27/72* (2013.01); *B64C 2027/7216* (2013.01)

(58) Field of Classification Search
CPC ....... B64C 29/0033; B64C 3/32; B64C 27/72; B64C 2027/7216
See application file for complete search history.

(56) References Cited

U.S. PATENT DOCUMENTS 3,128,829 A  *  4/1964  Young ................... B64C 11/003
                                                      416/88
6,168,379 B1    1/2001  Bauer
10,562,608 B1   2/2020  Gornall

FOREIGN PATENT DOCUMENTS

| EP | 2514669 | 10/2012 |
|---|---|---|
| KR | 101323836 | 10/2013 |
| WO | 2006041455 | 4/2006 |

* cited by examiner

*Primary Examiner* — Valentina Xavier
(74) *Attorney, Agent, or Firm* — Fish IP Law, LLP

(57) ABSTRACT

In one aspect the subject matter herein describes a cable tilt actuator for an aircraft propulsion unit. One embodiment comprises: a cable spool, fore and aft cable sections, a compression beam, a compression beam guide, and a linear actuator. As the linear actuator drives the compression beam, relative rotation is imposed between the compression beam and the spool. Described, in one aspect, is an embodiment configured to tilt an aircraft propulsion unit.

19 Claims, 16 Drawing Sheets

1403

1402

CABLE TILT ACTUATOR FOR AN AIRCRAFT

FIELD OF THE INVENTION

The field of the invention is aircraft dynamics control.

BACKGROUND

Propulsion units on tiltrotor aircraft may tilt to transition between wingborne and rotorborne configurations. Tilting of the propulsion unit may allow tiltrotor aircraft to efficiently operate in vertical takeoff and landing (VTOL) mode as well as wingborne mode using the same propulsion units.

SUMMARY

In one aspect, the subject matter herein describes a cable tilt-actuator for a tiltrotor aircraft. One or more linear actuators are configured to actuate a tiltrotor nacelle about a nacelle tilt axis. The linear actuator actuates the nacelle by sliding a compression beam fore and aft relative to the nacelle. As the compression beam slides fore and aft, the nacelle is driven to rotate about the nacelle tilt axis.

Force is applied from the compression beam to the spool by a plurality of cables. The spool is fixed rigidly to a wing structural member. Opposing cables wind partially around the spool—the spool being rigidly fixed to the wing structural member—and attach to opposite ends of the compression beam. As the compression beam moves fore and aft, the nacelle is caused to tilt about the nacelle tilt axis.

In one aspect—the subject matter herein describes a tilt actuator that addresses many issues faced by vertical takeoff and landing (VTOL)—and especially electric VTOL (eV-TOL) electric propulsion unit tilting systems. In one aspect, described herein is a tilt actuator that addresses the need for a lightweight, easy to package, tilt actuator. Furthermore, in one aspect a cable tilt actuator addresses the need for a large amount of angular travel—for example upwards of one-hundred degrees—with consistent mechanical advantage throughout the travel.

DETAILED DESCRIPTION

The advent of electric vertical takeoff and landing (eV-TOL) presents a new challenge in aircraft actuation. Tilt actuators have conventionally been very heavy and required supporting systems—such as hydraulic systems. The high weight penalty of conventional tilt actuators has been tolerated in turbine driven aircraft. EVTOL aircraft however—due to the limited energy reserves—may be especially weight sensitive. As such, hydraulic based tilt actuation systems may leave much to be desired for eVTOL tilt actuation applications. Furthermore, conventional linear actuator systems require a large, heavy linear actuator to achieve large tilt angle ranges. An additional problem—seen in some conventional tilt actuator systems—is a non-uniform mechanical advantage throughout the tilt travel range.

In one aspect, the subject matter herein presents a tilt actuation device that utilizes a plurality of cables and a linear actuator. Such a device may address several problems for eVTOL tilt actuation applications including: the desire for consistent effective mechanical advantage throughout the travel; the desire for an actuator that does not require a hydraulic support systems; the desire to package the tilt-actuator in space confined areas; the need for a light weight system; and, the desire for a large angular range of tilt actuation.

In one aspect—the subject matter herein describes a cable tilt-actuator—the actuator is configured to tilt a propulsion unit between vertical takeoff and landing (VTOL) mode and airplane mode.

In one aspect—the subject matter herein describes a tilt actuator that addresses many issues faced by vertical takeoff and landing (VTOL)—and especially (eVTOL) electric propulsion unit tilting systems. In one aspect, a tilt actuator described herein addresses a desire for a lightweight, easy to package, tilt actuator. Furthermore, in one aspect the subject matter herein addresses the need for a large amount of angular travel—for example upwards of one-hundred degrees—for example one-hundred and five degrees—with consistent mechanical advantage throughout the travel.

Figure 1:
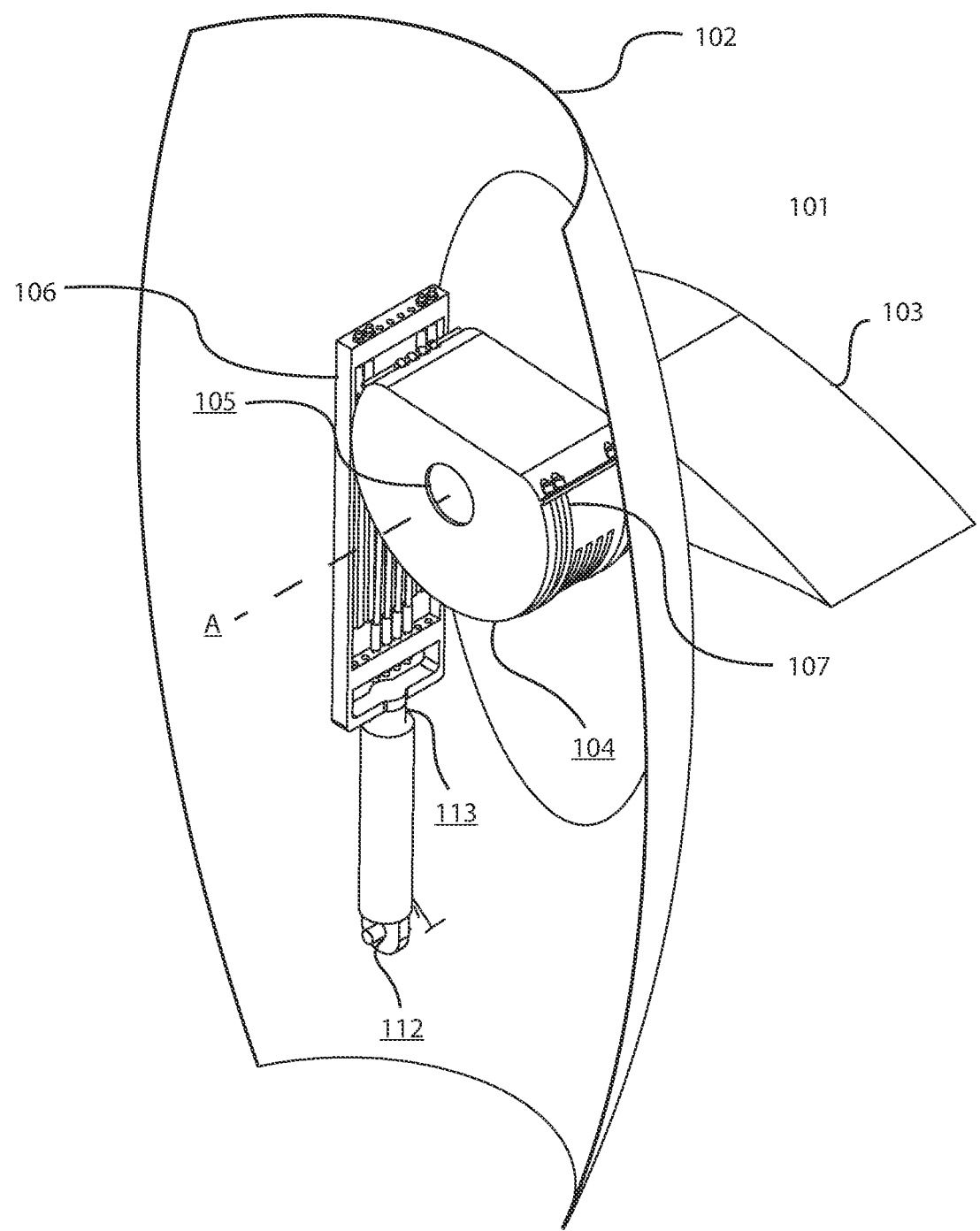
FIG. 1 illustrates a section view of a tiltrotor nacelle comprising an embodiment of a cable tilt actuator.
Figure 2:
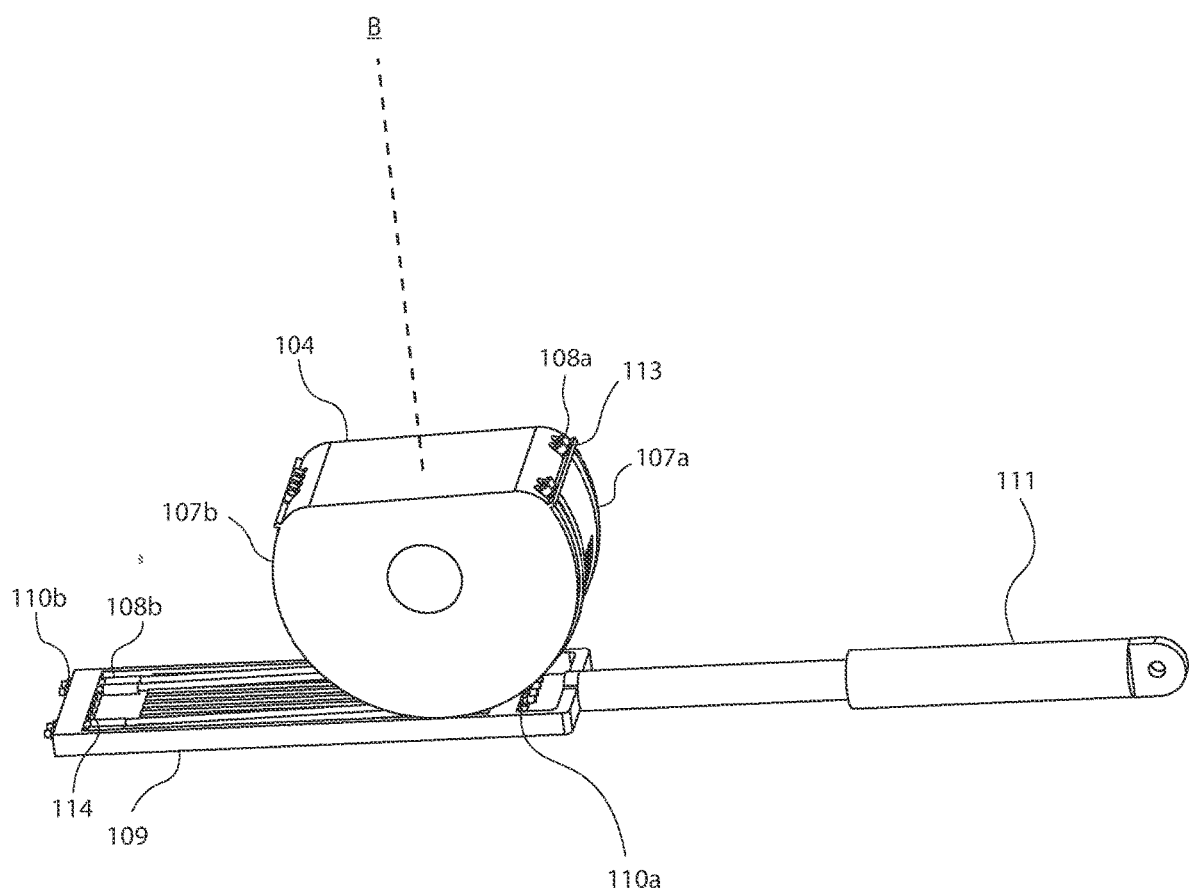
FIG. 2 shows a detailed view of some aspects of the embodiment of FIG. 1.

In one aspect, the subject matter herein—as shown in FIG. 1 and FIG. 2—describes a tilt actuator that is configured to convert linear actuation to rotary actuation using a first cable section 107*b*. A first cable section 107*b* is fixed—at a first end of the first cable section—relative to a cable spool 104; a second cable section 107*a* is fixed—at a first end of the second cable section—relative to a cable spool.

The second end of the first cable section 107b is fixed relative to a first end of compression beam 109. The second end of the second cable section 107a is fixed relative to a second end of compression beam 109, wherein the second end of the compression beam 109 is opposite the first end of the compression beam 109. A linear actuator 111 is configured to drive the compression beam. Linear actuation of the linear actuator 111 is transformed to rotational actuation using the first cable section 107b. In the embodiments of FIG. 1 and FIG. 2, there are a plurality of cable sections 107 that share the load in each direction.

In one aspect—the subject matter herein describes a cable tilt-actuator for a tiltrotor aircraft. One or more linear actuators are configured to actuate a tiltrotor nacelle about a nacelle tilt axis. The linear actuator actuates the nacelle by sliding a compression beam 107 fore and aft relative to the nacelle. As the compression beam slides fore and aft, the nacelle is driven to rotate about the nacelle tilt axis.

Force is transferred from a spool 104—to the compression beam 109, by way of a plurality of cables 107. The cable spool 104 is fixed rigidly to the wing structural member 105—shown in FIG. 1. In some embodiments, wing structural member 105 may comprise a wing spar section. Opposing cables 107 wind around the spool 104 and attach to opposite ends of the compression beam 109—as the compression beam 109 moves fore and aft, the nacelle 102 is caused to tilt about the nacelle tilt axis "A".

Shown in FIG. 1 is one embodiment of a cable tilt actuator. Tilt actuator system 101 is shown. Nacelle 102 is attached to wing 103 with an axial degree of freedom about nacelle tilt axis "A". Spool 104 is fixed relative to wing structural member 105.

FIG. 2 shows a detailed view of some aspects of the embodiment of FIG. 1. Aft Cables 107a are held fixed relative to spool 104 at a first end using cable ends 108a. The cable ends may be pulled tight against a locating feature—such as locating feature 113. Cable ends may comprise swaged ends or any suitable cable ends.

Linear actuator 111 drives compression beam 109 fore and aft relative to nacelle 102. Linear actuator 111 is attached to the nacelle 102 at linear actuator nacelle attachment pivot 112; in the embodiment of FIG. 1, the attachment pivot allows an axial degree of freedom. The forward shaft of linear actuator 111—in the embodiment of FIG. 1—is fixed to compression beam 109. Thus—in the embodiment of FIG. 1—the linear actuator 109 is moment carrying. Attachment pivot 112 may comprise a pin joint, ball joint or any suitable connection.

In the embodiment of FIG. 1, the compression beam 109 and linear actuator 111 behave as one light-moment resisting assembly with column stability in the extended direction.

As the compression beam 109 is driven forwards—by linear actuator 111, a tension force is applied to aft cables 107a and a reaction force is applied to the compression beam—through cable ends 108b—causing the nacelle to rotate. As compression beam 109 is driven forward, tension force on cables 107b is reduced—thus driving the compression beam 109 and the nacelle 102, to rotate.

The embodiment of FIG. 1 comprises eight cables 107. Eight cables—four fore cables 107b and four aft cables 107a provide strength to the embodiment. However, any other number of cables may be used. Furthermore, in FIG. 2, the illustrated embodiment is shown with the fore cables 107b on the inner four stations of the spool 104 and compression beam 109. While the aft cables 107a are illustrated on the outer stations of the spool 104 and compression beam 109. Such an arrangement allows for offsetting torques about an axis perpendicular to the compression beam—axis "B"—during nominal operating condition. Axis "B" is shown in FIG. 2. Other configurations such as alternating fore and aft cables may address instability caused by failure of one or more cables.

In the embodiment of FIG. 1, the compression beam 109 comprises a neutral plane in line with linear actuator 111 and cable attachment points 114. The cable attachment points 114 being co-planar with the centerline of the linear actuator 111 may address problems resulting from both external forces and cable tension forces acting on compression beam 109. The compression beam comprises rigid compression beam edges 115. The compression beam may comprise composite material such as carbon fiber.

In an alternative embodiment, the compression beam comprises a top hat structure—which addresses the desire for the cable attachment points 114 to be in a plane with the center of the linear actuator 111.

Any suitable type of linear actuator may be used including: a ball-screw linear actuator or a threaded rod linear actuator, or any other suitable linear actuator. Some embodiments may comprise an electric linear actuator. Some embodiments may comprise a linear actuator that comprises an anti-rotation device which may address twisting of the compression beam in some embodiments.

The embodiment of FIG. 1 comprises cable tensioners 110a and 110b—shown in FIG. 2. The cable tensioners may comprise a nut configured to thread onto the respective cable ends 108b. The cable tensioners 1010a and 1010b may be used to load preload into the system. Cable tensioners 110a and 110b may be tightened to preload the system. Preloading addresses the problem of backlash. The embodiment of FIG. 1 comprises one preload feature per cable—such a configuration allows for preload to be ideally balanced between the different cables 107.

Some embodiments may have additional features for loading preload into the system—for example, some embodiments may comprise springs, washers, flexure devices, or any suitable device for loading preload into the system. Addressing backlash in a propulsion unit tilt actuator may be desired because backlash and lack of rigidity in a propulsion unit tilt actuator system may affect aircraft dynamics. In some embodiments, the cable ends, compression beam, or other aspect of the tilt actuator system may address the problem of pre-load. Likewise, in some embodiments the cable tensioner may also address the problem of fixing the cables 107 relative to the compression beam 109.

Figure 3:
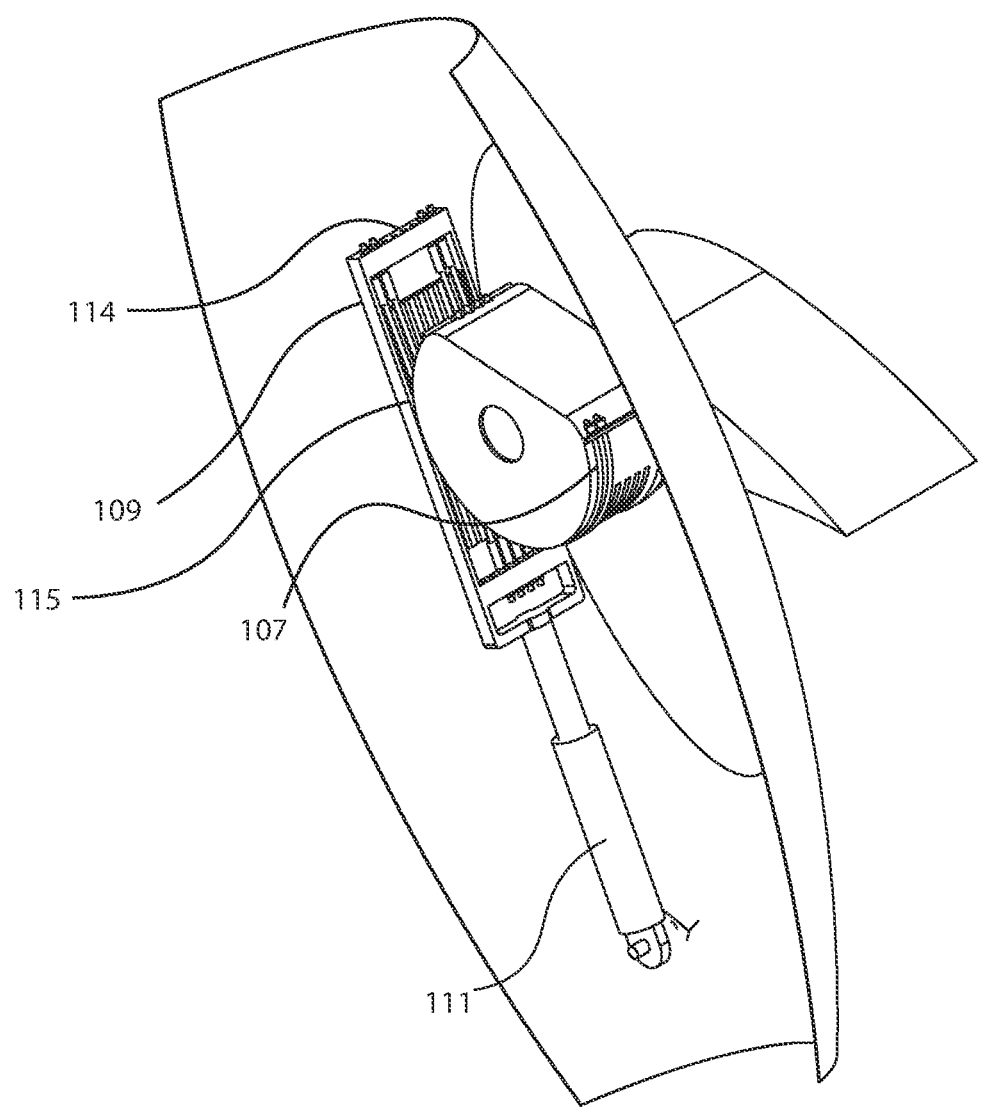
FIG. 3 illustrates the same embodiment of FIGS. 1—FIG. 3 merely illustrates the embodiment at a different position in the tilt travel range.

FIG. 3 illustrates the same embodiment of FIG. 1—FIG. 3 merely illustrates the embodiment at a different position in the tilt travel range. FIG. 3 corresponds to a nacelle angle that may occur during aircraft transition between VTOL mode and wingborne mode. Linear actuator 111 drives compression beam 109 towards the front of the nacelle 102. The reaction force—to the resulting cable loading—applies a torque to the nacelle 102. The nacelle is driven to rotate from the angular position shown in FIG. 1 to the angular position shown in FIG. 3.

Figure 4:
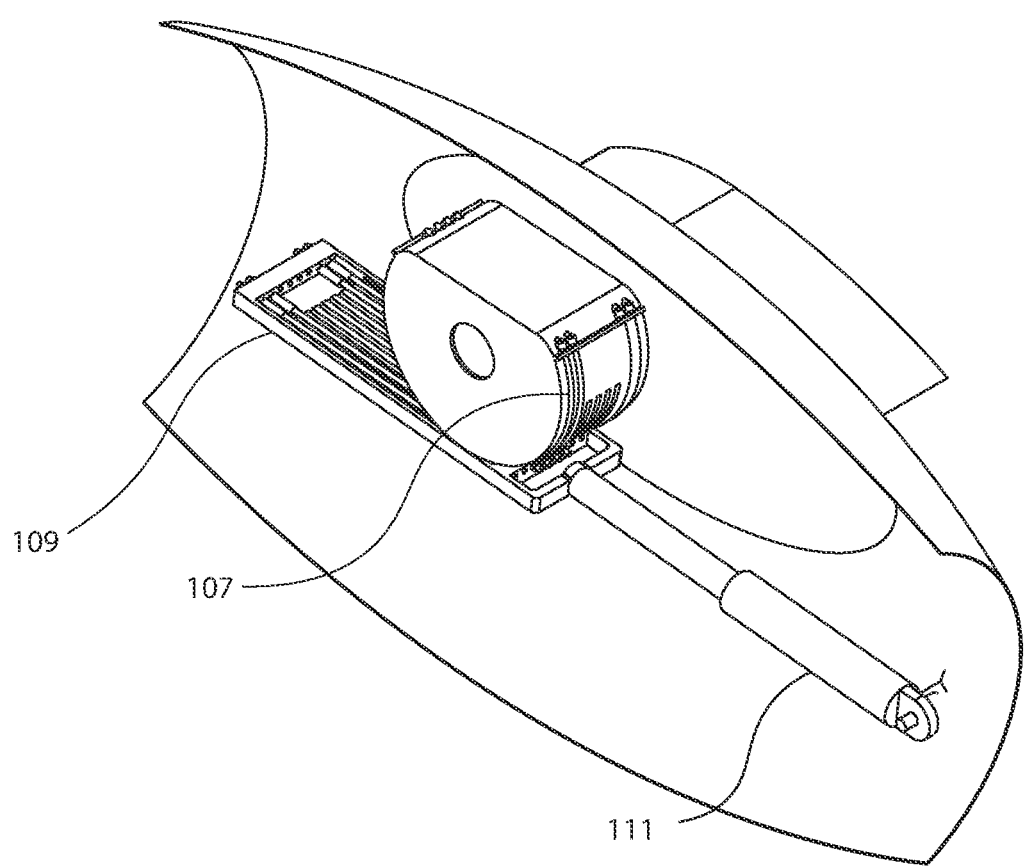
FIG. 4 illustrates the same embodiment of FIGS. 1 and 3—FIG. 4 merely illustrates the embodiment at a different position in the tilt travel range.

FIG. 4 illustrates the same embodiment of FIGS. 1, 2, and 3—FIG. 4 merely illustrates the embodiment at a different position in the tilt travel range. FIG. 4 corresponds to a nacelle-to-wing angle that may occur during wingborne flight mode.

Figure 5:
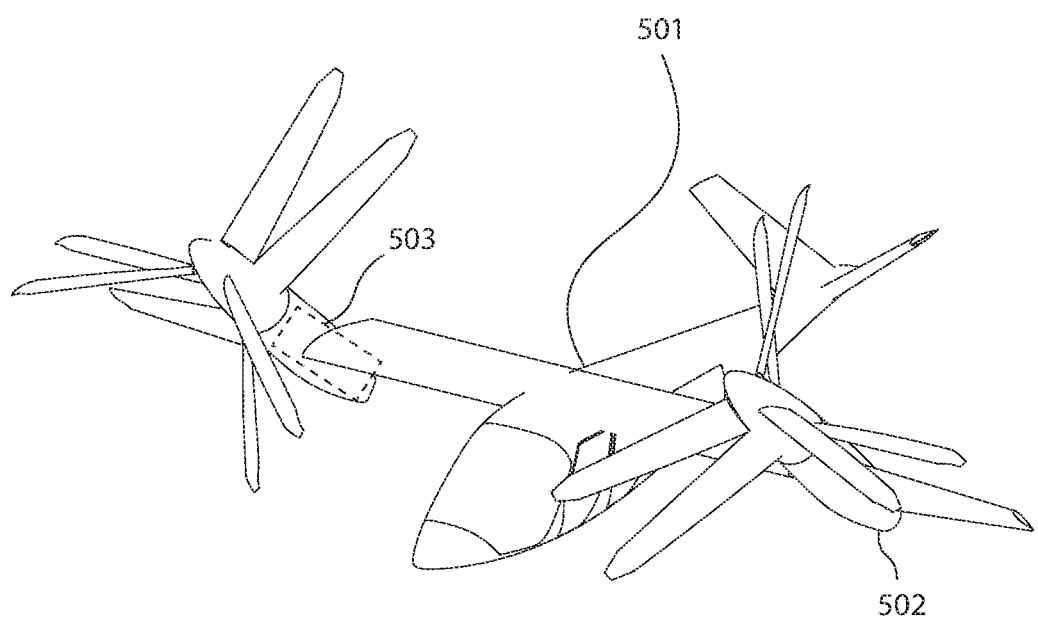
FIG. 5 illustrates an aircraft that could comprise aspects of the subject matter described herein.

FIG. 5 illustrates an aircraft 501 that may comprise aspects of the subject matter described herein. The embodiment of FIG. 5 comprises two cable tilt actuator systems 503—one configured to tilt each nacelle 502. Other embodiments may comprise any number of cable tilt actuators.

Figure 6A:
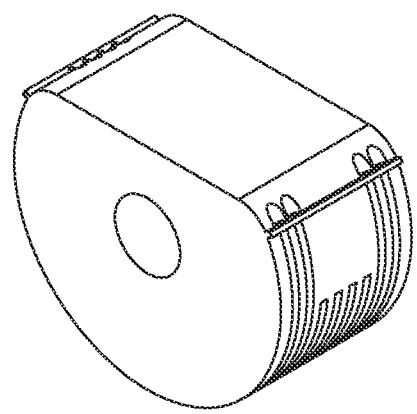
FIG. 6A illustrates an embodiment of a spool.
Figure 6B:
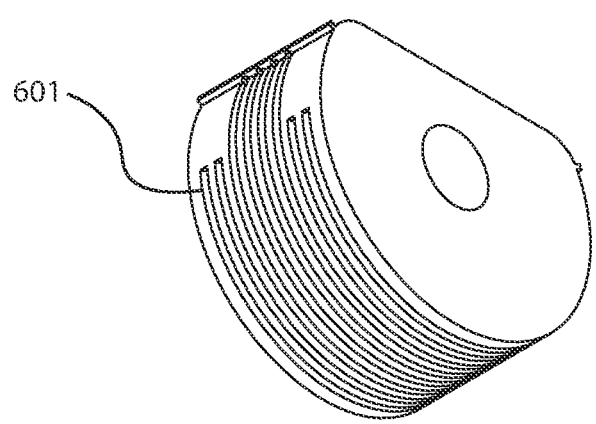
FIG. 6B illustrates the same embodiment of a spool as FIG. 6a, only viewed from a different angle.

FIGS. 6A and 6B illustrate an embodiment of a spool 104. Spool 104 comprises cable guide grooves 601.

Figure 7A:
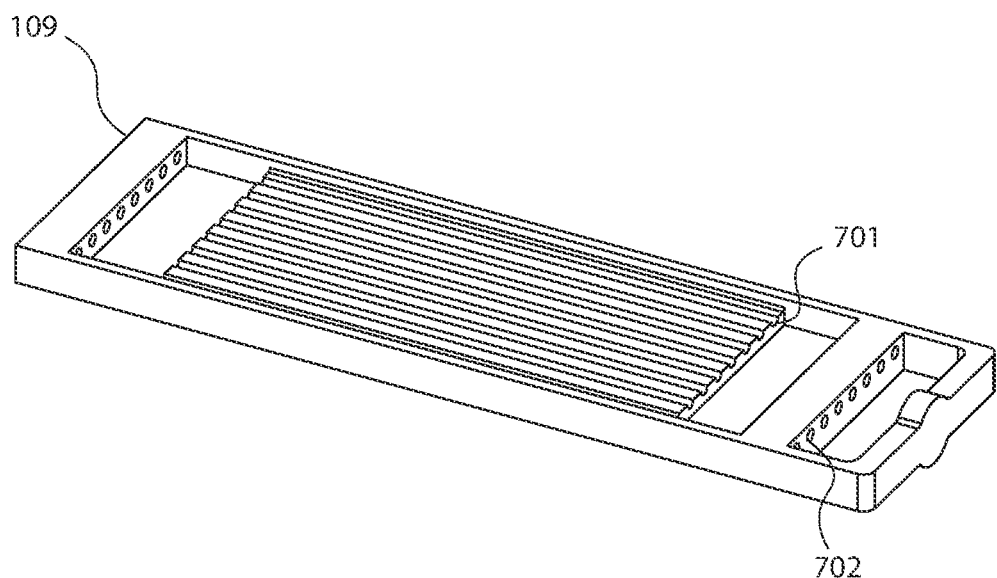
FIG. 7A illustrates an embodiment of a cable actuator compression beam.

FIG. 7A illustrates an embodiment of a compression beam. Compression beam 109 comprises cable guide grooves 701 and cable end locating features 702.

Figure 7B:
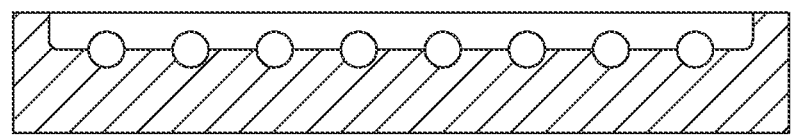
FIG. 7B illustrates a section view of one aspect of the embodiment of a cable actuator—the same embodiment as shown in FIG. 7A.

FIG. 7B illustrates a section view of an embodiment of a compression beam—FIG. 7B illustrates the same embodiment as shown in FIG. 7A.

In one aspect, the subject matter herein describes a tilt actuator system that tilts a propulsion unit. Some embodiments may be configured to tilt substantially a whole nacelle along with the propulsion unit, while other embodiment may be configured to tilt only a portion of the nacelle. Furthermore, other embodiments may be configured to tilt any portion of the aircraft.

Figure 8:
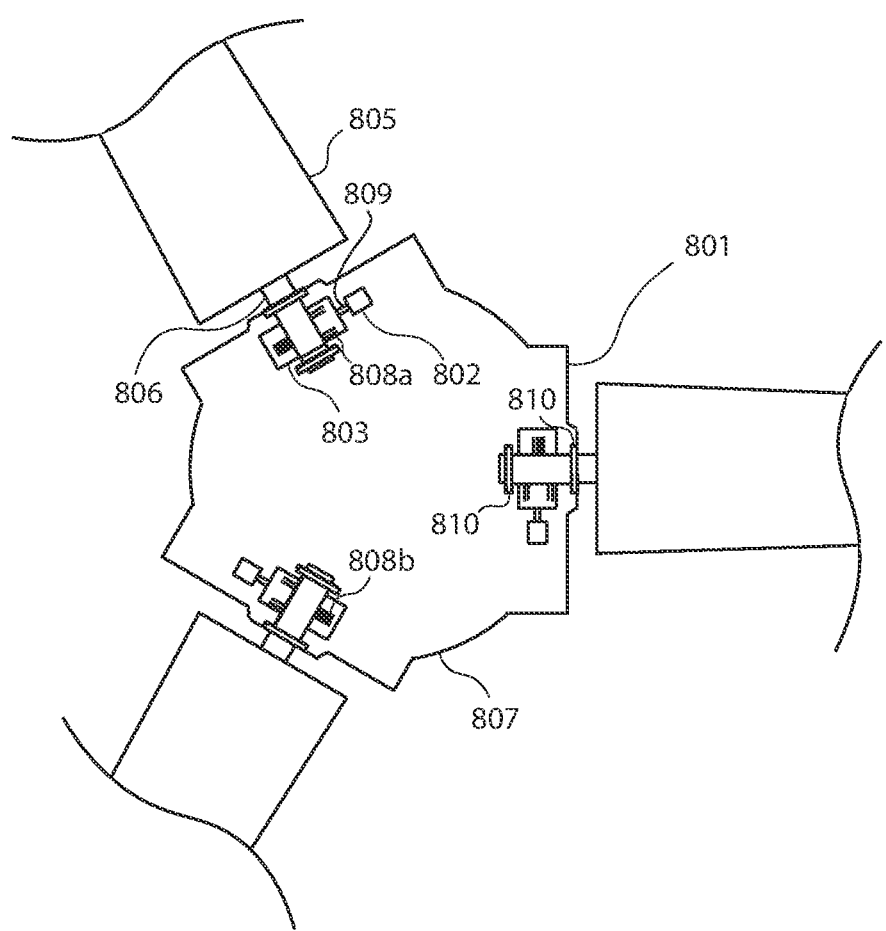
FIG. 8 illustrates a rotor system comprising an embodiment of a cable blade pitch actuator.

In a second aspect, the subject matter herein describes a scalable aircraft actuator. FIG. 8 illustrates a rotor system 800. Rotor system 800 comprises an embodiment configured to actuate blade pitch. Rotor hub 801 comprises actuators 802. The actuators comprise compression beams 803. Rotor system 800 comprises rotor blades 805. Rotor blades 805 comprise rotor blade spars 806.

Motors 802 drive ball-screws 809. As the compression beams are driven by motor 802—through ball screws 809—the tension on either cables 808a or cables 808b is increased. The cable set with the increased tension causes the blade to rotate about the blade pitch axis (also known as the feather axis). In the embodiment of FIG. 8, rotor blade spar 806 comprises a spool. In other embodiments, the rotor system may comprise a separate spool—the spool would be fixed relative to the blade spar. The blade spar is located—with a rotational degree of freedom—by rotor blade pitch bearings 810.

Alternative to the actuator orientation shown in FIG. 8, the actuator system could be oriented at any angle about the rotor blade pitch axis—for example, the actuator could be oriented such that the motor was coming out of the page.

While the term rotor blade is used in the preceding example—it should be understood that concepts described herein may be applicable to any propulsion blade pitch actuation system including: rotors, propellers, prop-rotors, etc.

Figure 9A:
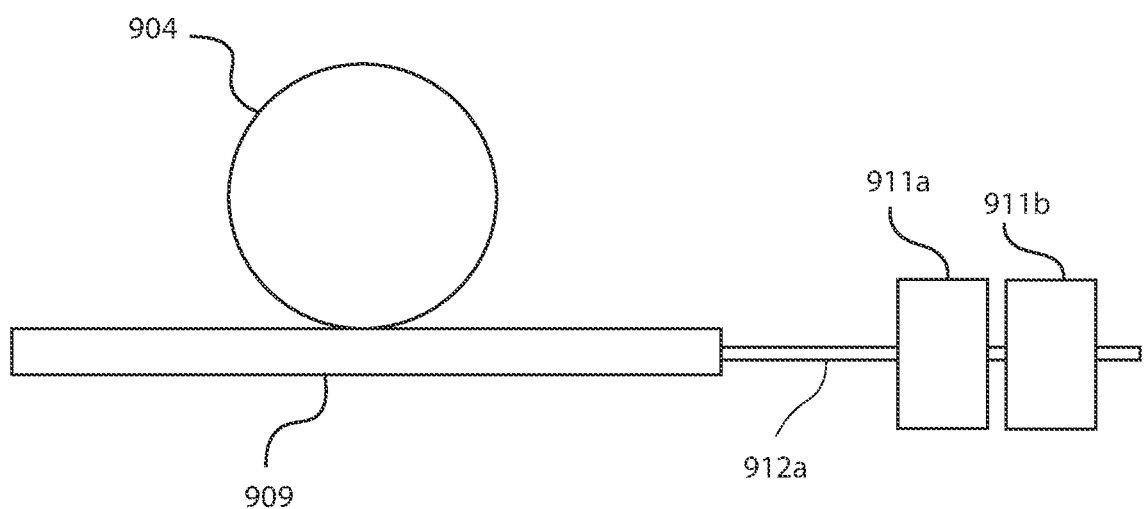
FIG. 9A illustrates an embodiment of a cable tilt actuator with redundant motors.

FIG. 9A illustrates an embodiment of a cable tilt actuator with redundant motors. Threaded shaft 912a is configured to be driven optionally by either motor 911a or 911b. The redundant motors address the desire for high levels of safety and redundancy in many aerospace applications. Shown also is cable spool 904 and compression beam 909.

Figure 9B:
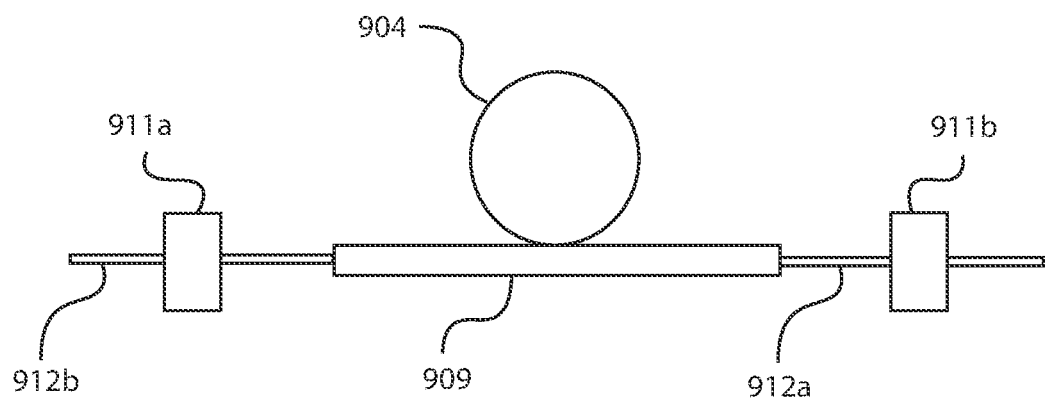
FIG. 9B illustrates an embodiment of a cable tilt actuator with redundant motors and redundant ball-screw shafts.

FIG. 9B illustrates an alternative embodiment of a cable tilt actuator with redundant motors 911. The embodiment of FIG. 9b comprises a first and a second threaded shaft 912a and 912b. If one motor 911 fails, the operational motor 911 can drive the compression beam 909.

Figure 10:
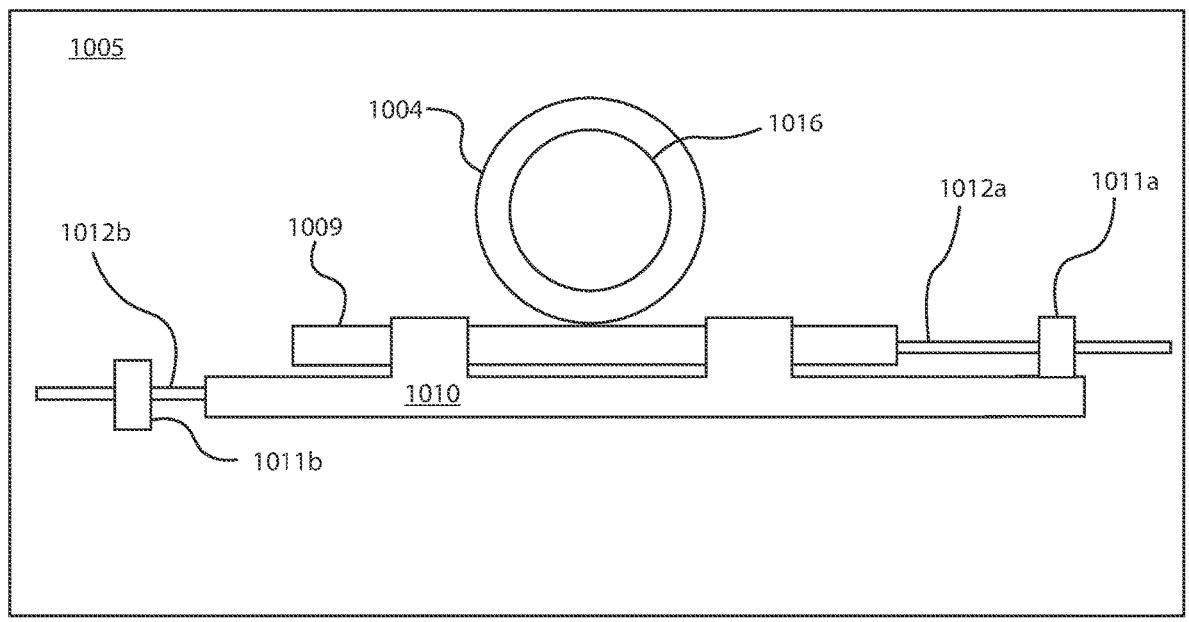
FIG. 10 illustrates, in one aspect, a jam-tolerant embodiment of a cable tilt actuator.

In one aspect, the subject matter herein describes a jam tolerant cable actuator. The embodiment illustrated in FIG. 10 illustrates an embodiment of a jam tolerant cable tilt actuator. The embodiment comprises a compression beam 1009 and housing 1010.

The motor 1011b may lock itself in place using the motor or a locking mechanism which may be part of the motor or may be a separate unit. Motor 1011a may be commanded—under nominal operating conditions—to drive tray 1009 longitudinally in order to actuate tilt. Under normal operating conditions, the embodiment of FIG. 10 operates similar to the embodiment of FIG. 1 since housing 1010 remains fixed relative to motor 1011b—motor 1011b is attached at a pivot point to the nacelle. However, in the event of a jam in motor 1011a, motor 1012b may unlock and drive housing 1010 longitudinally to actuate tilt. There may be a lock that locks cable tray 1009 fixed to housing 1010 during fail—operation mode—addressing the problem of motor 1011a becoming unjammed during fail-operation mode. Motor 1011b is fixed relative to the nacelle 1005. Spool 1004 is fixed relative to wing structural member 1016.

Figure 11:
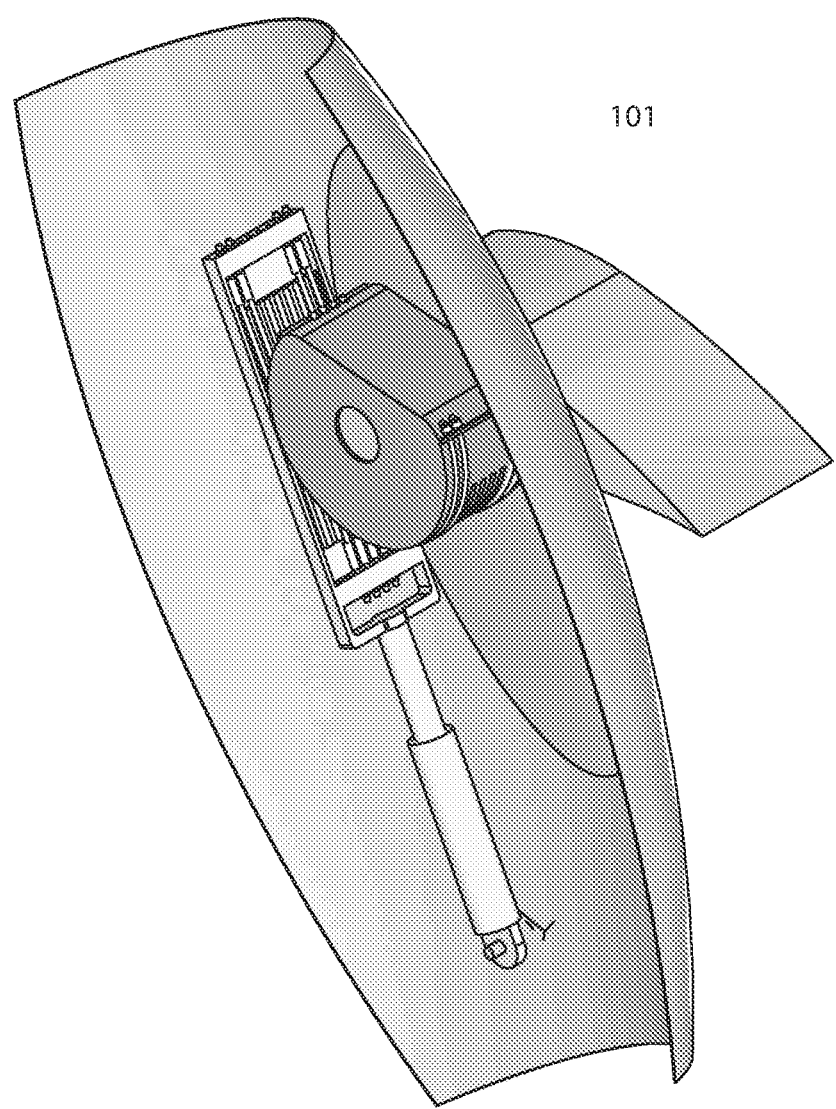
FIG. 11 illustrates a color-coded view of an embodiment.

Shown in FIG. 11 is a color-coded illustration of an embodiment. The green components correspond to components that may remain fixed relative to the wing. The red aspects correspond to aspects that may rotate with the nacelle. The yellowish-orange aspects correspond to aspects that may rotate with the nacelle but may have additional components of motion as well. The cables are illustrated as gray.

Figure 12:
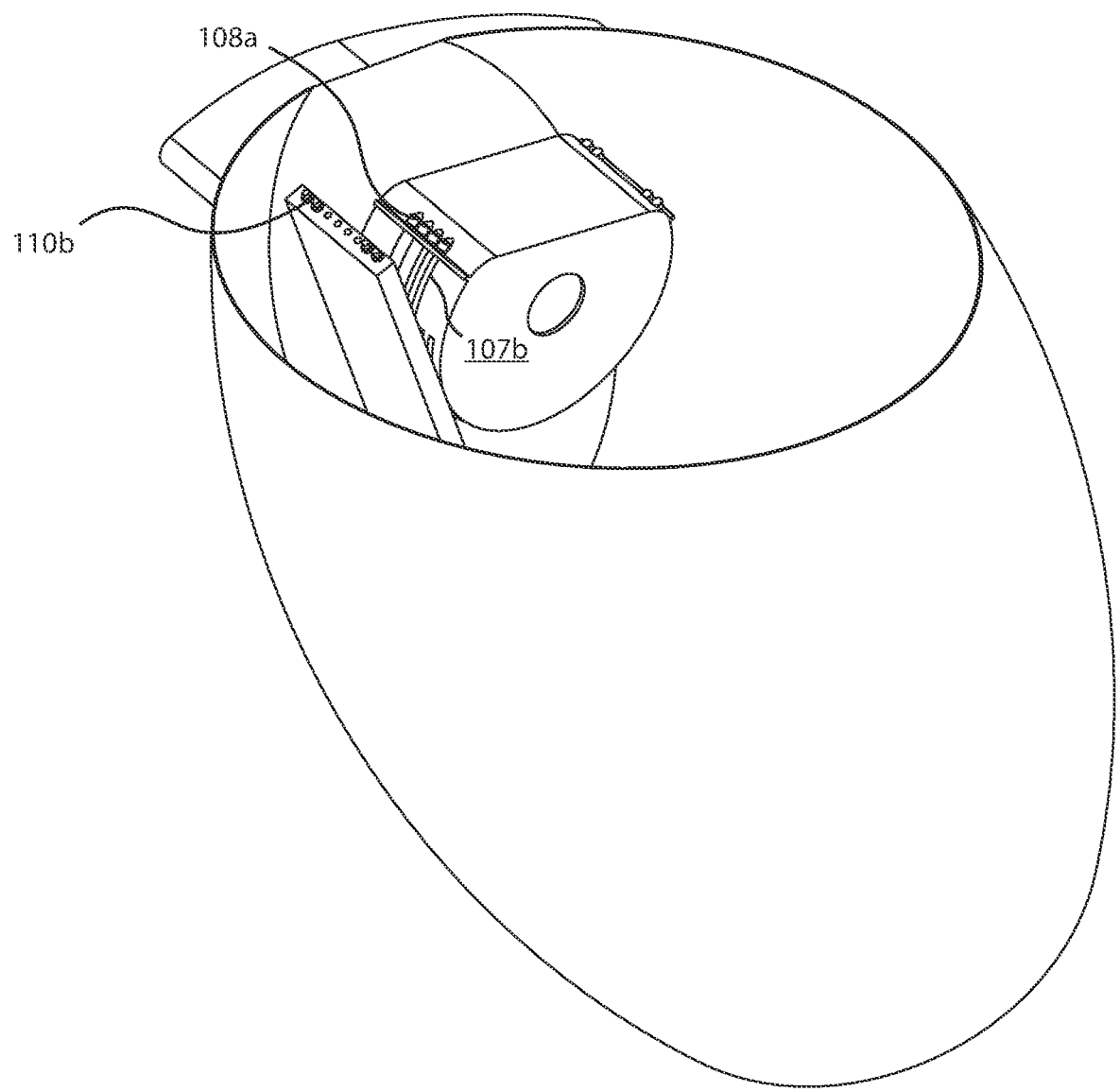
FIG. 12 illustrates a cutaway view of the same embodiment of FIG. 1—as view from the near the front of the nacelle.

FIG. 12 shows a cutaway view of the embodiment of FIG. 1 as viewed from towards the front of the nacelle. Cable ends 108a and cable tensioners 110b are shown.

Figure 13A:
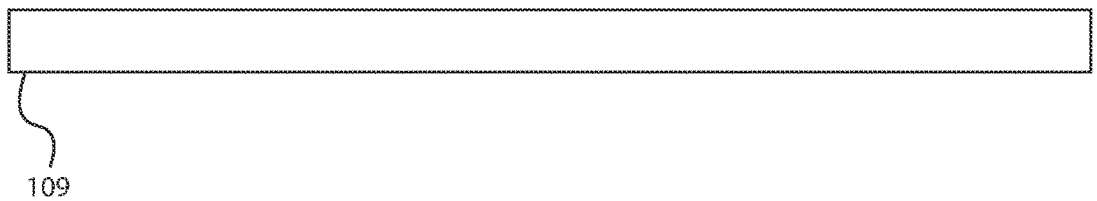
FIG. 13A illustrates the embodiment of a compression beam illustrated in FIG. 1.

FIG. 13A illustrates a side view of a compression beam of one embodiment.

Figure 13B:
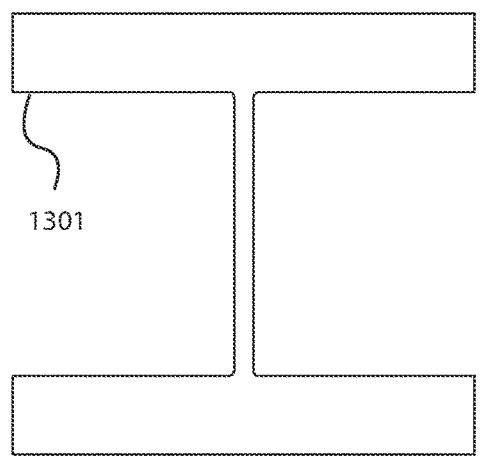
FIG. 13B illustrates an alternative embodiment of a compression beam.

FIG. 13B illustrates an end view of an alternative embodiment of a compression beam 1301. The compression beam embodiment illustrated in FIG. 13B comprises an "I" beam structure to increase rigidity. High rigidity in the compression beam may address a challenge of high bending loads created by the cable tension. High compression beam rigidity addresses the desire for a very rigid tilt actuation system. Other rigidity increasing beam structures may be used including "C" channel beam shape or any other suitable design that addresses rigidity.

Figure 13C:
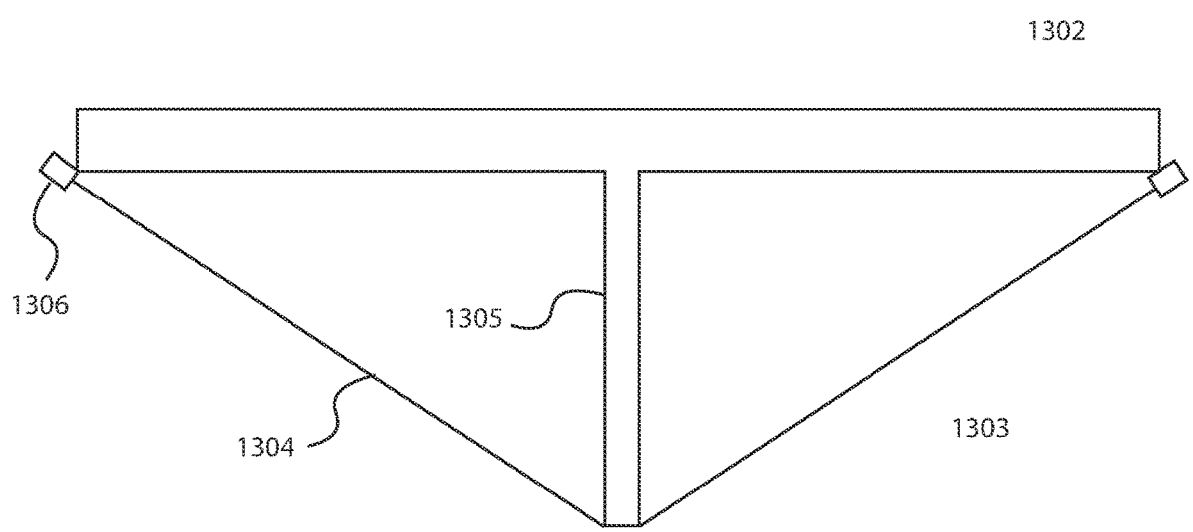
FIG. 13C illustrates another alternative embodiment of a compression beam.

FIG. 13C illustrates a side view of another alternative embodiment of a compression beam 1302. The compression beam embodiment of FIG. 13C may comprise a cable truss 1303. Compression beam 1302 may comprise truss cables 1304, truss support 1305, cable straps 1306. The cable straps 1306 may comprise a device for pre-loading the cable 1304. The cable truss 1303 may address bending introduced into the compression beam by the cables connected to the spool.

Figure 14:
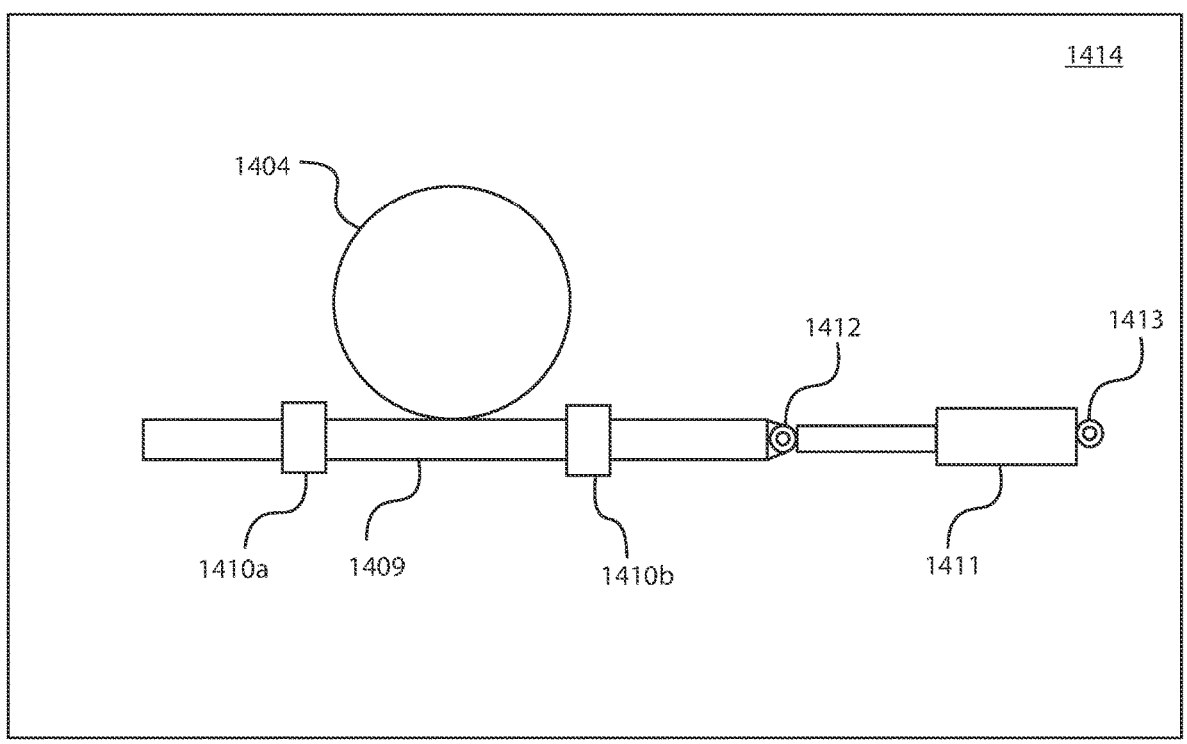
FIG. 14 illustrates an alternative embodiment.

FIG. 14 illustrates an alternative embodiment of a cable tilt actuator. The embodiment of FIG. 14 comprises spool 1404, compression beam 1409, and compression beam sliders 1410. The linear actuator 1411 is attached to compression beam 1409 at a compression beam pivot attachment 1412. The linear actuator 1411 is attached to nacelle 1414 at nacelle pivot attachment 1413. The embodiment of FIG. 14 transfers moment to the nacelle through compression beam sliders 1410a and 1410b.

Figure 15:
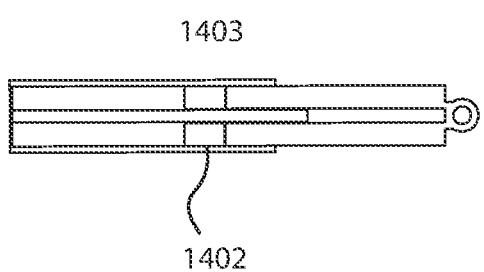
FIG. 15 illustrates an embodiment of a linear actuator.

FIG. 15 illustrates an embodiment of a linear actuator 1403. The linear actuator may comprise motor 1402.

Figure 16:
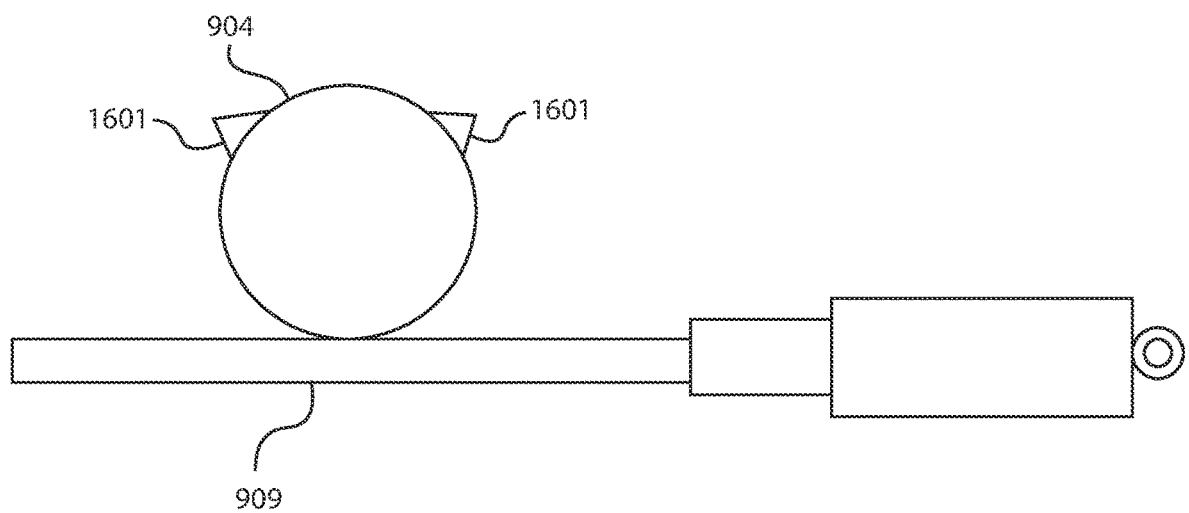
FIG. 16 illustrates an embodiment comprising end stops.

In one aspect, the subject matter herein describes a tilt actuator comprising end stops 1601—illustrated in FIG. 16. The end stops may be fixed relative to the cable spool 904. End stops 1601 may address the desire for actuator rigidity at either end of travel.

Aspects of the subject matter described herein may comprise any suitable material or combination thereof, including: metal, composite, plastics, resin, rubber, fiber, or any other suitable material.

It should be understood that the number of cables as well as the type and size of cables used may be selected to address desired system characteristics. Furthermore, the dimensions of various aspects may be selected to address desired characteristics, including the dimensions of an embodiment of a spool. In some embodiments a high ratio of spool diameter to cable diameter may address longevity problems.

In one aspect of the subject matter herein describes tilt actuators comprising four cables that apply tension in a first direction and four cables that apply tension in a second direction. However, it should be understood that any number of cables may be configured to apply tension in each direction—for example 1, or 2, or 3. Furthermore, one or more cables could be divided into cable sections—the cable sections being configured to carry loads as independent cables.

In one aspect, the subject matter herein describes actuator embodiments using cables. However, it should be understood that other embodiments may comprise: chain; chord; rope; belt; or, any other suitable material. Such embodiments may comprise components configured for use with the selected material.

While some aspects described herein describe examples of the subject matter, it should be understood aspects described herein could have very broad application, especially in aircraft dynamics controls.

The invention claimed is:

1. An aircraft propulsion unit tilt actuator comprising a first cable section, wherein the tilt actuator is configured to convert linear motion to rotary motion using the first cable section, wherein the tilt actuator further comprises a second cable section, wherein the first cable section is configured to drive an aircraft propulsion unit in a first rotational direction when tension is applied to the first cable section and wherein the second cable section is configured to drive the aircraft propulsion unit in a second rotational direction when tension is applied to the second cable section.

2. The aircraft propulsion unit tilt actuator of claim 1 additionally comprising a compression beam wherein the first cable section is attached to a first end of the compression beam and the second cable section is attached to a second end of the compression beam and wherein tension is increased on the first cable section by moving the compression beam in a first compression beam direction and tension is increased on the second cable section by moving the compression beam in a second compression beam direction.

3. The aircraft propulsion unit tilt actuator of claim 2 further comprising a linear actuator, wherein the compression beam is capable of being driven in a first and a second direction by the linear actuator.

4. The aircraft propulsion unit tilt actuator of claim 3 wherein the linear actuator is an electric linear actuator.

5. The aircraft propulsion unit tilt actuator of claim 2 wherein the compression beam rotates with the aircraft propulsion unit.

6. The aircraft propulsion unit tilt actuator of claim 5 further comprising a cable spool.

7. The aircraft propulsion unit tilt actuator of claim 6 wherein the aircraft propulsion unit tilt actuator is configured to rotate a nacelle.

8. An aircraft comprising:
an aircraft propulsion unit tilt actuator comprising a first cable section, wherein the aircraft propulsion unit tilt actuator is configured to convert linear motion to rotary motion using the first cable section, wherein the tilt actuator further comprises a second cable section, wherein the first cable section is configured to drive a rotating portion in a first rotational direction when tension is applied to the first cable section and wherein the second cable section is configured to drive the rotating portion in a second rotational direction when tension is applied to the second cable section.

9. An aircraft dynamics control actuator comprising a first cable section, wherein the tilt actuator is configured to convert linear motion to rotary motion using the first cable section, wherein the tilt actuator further comprises a second cable section, wherein the first cable section is configured to drive a rotating portion in a first rotational direction when tension is applied to the first cable section and wherein the second cable section is configured to drive the rotating portion in a second rotational direction when tension is applied to the second cable section.

10. The aircraft dynamics control actuator of claim 9 additionally comprising a compression beam wherein the first cable section is attached to a first end of the compression beam and the second cable section is attached to a second end of the compression beam and wherein tension is increased to the first cable section by moving the compression beam in a first compression beam direction and tension is increased to the second cable section by moving the compression beam in a second cable try direction.

11. The aircraft dynamics control actuator of claim 10 further comprising a linear actuator, wherein the compression beam is capable of being driven in a first and a second direction by the linear actuator.

12. The aircraft dynamics control actuator of claim 11 wherein the linear actuator is an electric linear actuator.

13. The aircraft dynamics control actuator of claim 10 wherein the compression beam rotates with a propulsion unit.

14. The aircraft dynamics control actuator of claim 13 further comprising a cable spool.

15. The aircraft dynamics control actuator of claim 14 wherein the aircraft propulsion unit tilt actuator is configured to rotate a nacelle.

16. A rotary actuator comprising:
a linear actuator;
a cable spool;
at least a first and second cable section;
a compression beam, wherein the compression beam is configured to maintain tension on the first and second cable sections, and wherein the compression beam is configured to apply more tension to the first cable than the second cable when the linear actuator extends and apply more tension to the second cable than the first cable when the linear actuator retracts.

17. The rotary actuator of claim 16 wherein the linear actuator is connected to a first external structure at a first point and wherein the cable spool is connected to a second external structure at a second point.

18. The rotary actuator of claim 17 additionally comprising a pin joint, wherein the pin joint is configured to connect the linear actuator to the first external structure.

19. The rotary actuator of claim 17 wherein the cable spool is fixed relative to the second external structure.

* * * * *